(12) United States Patent
Suzuki (10) Patent No.: US 7,561,748 B2
(45) Date of Patent: Jul. 14, 2009

(54) ELECTRONIC CAMERA

(75) Inventor: Masahiro Suzuki, Inzai (JP)

(73) Assignee: Nikon Corporation, Tokyo (JP)

( * ) Notice: Subject to any disclaimer, the term of this patent is extended or adjusted under 35 U.S.C. 154(b) by 522 days.

(21) Appl. No.: 11/320,450

(22) Filed: Dec. 29, 2005

(65) Prior Publication Data

US 2006/0104523 A1 May 18, 2006

Related U.S. Application Data

(63) Continuation of application No. PCT/JP2004/009240, filed on Jun. 23, 2004.

(30) Foreign Application Priority Data

Jul. 3, 2003 (JP) .............................. 2003-190981

(51) Int. Cl.
*G06K 9/36* (2006.01)
(52) U.S. Cl. ................ 382/232; 382/173; 382/233; 382/240; 382/250; 382/251; 358/538; 358/539
(58) Field of Classification Search ................. 382/232, 382/233, 239, 240, 248, 250, 251, 173; 358/538, 358/539
See application file for complete search history.

(56) References Cited

U.S. PATENT DOCUMENTS

| 6,501,853 | B1 | 12/2002 | Gregg et al. | |
| 6,904,176 | B1* | 6/2005 | Chui et al. | 382/240 |
| 7,130,454 | B1* | 10/2006 | Berube et al. | 382/118 |
| 2003/0210803 | A1* | 11/2003 | Kaneda et al. | 382/100 |
| 2004/0099741 | A1* | 5/2004 | Dorai et al. | 235/462.08 |
| 2005/0117816 | A1* | 6/2005 | Saeger et al. | 382/305 |

FOREIGN PATENT DOCUMENTS

| EP | 1 162 573 A2 | 12/2001 |
| JP | A 05-268484 | 10/1993 |
| JP | A 06-217111 | 8/1994 |
| JP | A 07-240922 | 9/1995 |
| JP | A 07-288806 | 10/1995 |
| JP | A 08-140096 | 5/1996 |
| JP | A 08-205144 | 8/1996 |
| JP | A 09-327019 | 12/1997 |
| JP | A 11-136568 | 5/1999 |
| JP | A 11-215498 | 8/1999 |
| JP | A 2000-023100 | 1/2000 |

(Continued)

*Primary Examiner*—Bhavesh M Mehta
*Assistant Examiner*—Ali Bayat
(74) *Attorney, Agent, or Firm*—Oliff & Berridge, PLC (57) ABSTRACT

An electronic camera includes an image capturing section, a guide section, a display section, and an image compressing section. More specifically, the image capturing section captures a subject and generates image data. The display section combines, for display, image data for monitoring captured by the image capturing section and an auxiliary display for supporting a selection of an ROI region and/or a tile. For example, it is desirable to use a guide display to show a user a recommendable composition on a monitor display or the like as such an auxiliary display. The compression processing section selects an image region corresponding to such an auxiliary display as the ROI region and/or tile to be used in image compression and thereafter compresses an image of image data for recording captured by the image capturing section.

12 Claims, 8 Drawing Sheets

FOREIGN PATENT DOCUMENTS

| | | |
|---|---|---|
| JP | A 2001-208960 | 8/2001 |
| JP | A 2002-152558 | 5/2002 |
| JP | A 2002-176650 | 6/2002 |
| JP | A 2002-271790 | 9/2002 |
| JP | A 2003-143463 | 5/2003 |
| WO | WO 97/03525 A1 | 1/1997 |
| WO | WO 99/51035 A1 | 10/1999 |
| WO | WO 02/071759 A1 | 9/2002 |

* cited by examiner

(B) 68 ROI REGION (C)

ELECTRONIC CAMERA

CROSS REFERENCE TO RELATED APPLICATION

This application is a continuation application of International Application PCT/JP2004/009240, filed Jun. 23, 2004, designating the U.S, and claims the benefit of priority from Japanese Patent Application No. 2003-190981, filed on Jul. 3, 2003, the entire contents of which are incorporated herein by reference.

BACKGROUND OF THE INVENTION

1. Field of the Invention

The present invention relates to a technique of properly setting an ROI region and/or a tile in an electronic camera which executes image compression.

2. Description of the Related Art

In December 1999, a committee draft (CD) of an image compression algorithm of JPEG2000 was made, finalizing the main technical contents.

Image compression processing of the JPEG2000 will be outlined below.

(1) Color Coordinate Transformation

An inputted image is subjected to a color coordinate transformation as required.

(2) Tile Division

The inputted image is divided into plural rectangular regions (each hereinafter referred to as a tile) as required. The respective tiles are independently subjected to subsequent coding processing.

(3) Wavelet Transform

The inputted image is subjected to a discrete wavelet transform in two vertical and horizontal directions and frequency-decomposed into plural subbands (1LL, 1LH, 1HL, 1HH). Among these subbands, 1LL containing a direct-current component is further subjected to the discrete wavelet transform and frequency-decomposed into plural subbands (2LL, 2LH, 2HL, 2HH).

By recursively repeating the discrete wavelet transform as described above, image data is decomposed into subbands.

(4) Quantization

Wavelet transform coefficients are quantized by quantization step widths set for each subband. The quantization step is set to "1" in lossy/lossless unified processing. In this case, in lossy compression, lower N bit planes are discarded in a post-process. This discarding processing is equivalent to the quantization step of the N-th power of 2.

(5) Bit Modeling

The quantized wavelet transform coefficients are divided into coding blocks of a fixed size (for example, 64×64) within each subband. Transform coefficients within each of the coding blocks are divided into sign bits and absolute values, and thereafter, the absolute values are distributed to natural binary bit planes. The bit planes thus constructed are coded in order from the upper bit plane via three coding passes (Significance pass, Refinement pass, Cleanup pass). Incidentally, the sign bits are coded immediately after the most significant bits of the corresponding absolute values have appeared on the bit planes.

(6) ROI (Region of Interest) Coding

It is a function of allocating a certain amount of information preferentially to a selected partial region on an image (hereinafter referred to an ROI region) to improve the decoded image quality of the ROI region. More specifically, the quantized transform coefficients located in the ROI region are shifted upward by S bits. As a result, the ROI region is shifted to the upper bit planes, and coded with a higher priority than any bit of a non-ROI region.

According to a max shift method, the bit shift number S is set to be larger than the digit number of the most significant bit in the non-ROI region. Therefore, non-zero transform coefficients of the ROI region always have values equal to or more than the S-th power of 2. Hence, at the time of decoding, the transform coefficients of the ROI region can be easily restored by selectively shifting down quantized values equal to or more than the S-th power of 2.

(7) Arithmetic Coding

The coded data is further subjected to arithmetic coding using a MQ coder.

(8) Bit Stream Formation

A bit stream is formed by arranging the coded data of the inputted image in a predetermined order (for example, SNR progressive).

In addition, regarding JPEG2000, the following Patent Document 1 Japanese Unexamined Patent Application Publication No. 2002-176650 filed in Japan) is known. Patent Document 1 discloses a technique of setting degradation of the image quality of the non-ROI region to an appropriate extent by adjusting the area of the ROI region.

At setting the ROI region and the tile as above, it is desirable that they be set so as to include an important portion on a screen. However, with an electronic camera, a user needs to concentrate on photographing. Therefore, it is desirable that the user can easily and rapidly set the ROI region and the tile in the electronic camera.

SUMMARY OF THE INVENTION

In view of the above-described problem, an object of the present invention is to easily set an ROI region and/or a tile in an electronic camera.

The present invention will be described below.

[1] An electronic camera of the present invention includes an image capturing section, a display section, and a compression processing section. The image capturing section captures a subject and generates image data. The display section combines, for display, image data for monitoring captured by the image capturing section and an auxiliary display for supporting a selection of an ROI region and/or a tile to be used in image compression. The compression processing section selects, for the ROI region and/or tile, an image region which is preset in accordance with the auxiliary display, and thereafter compresses image data for recording captured by the image capturing section.

[2] Preferably, the electronic camera further includes a guide section which determines a guide display to show a recommendable composition according to a kind of a photographic subject a user selects. The display section combines, for display, the image data for monitoring captured by the image capturing section and the guide display as the auxiliary display. The compression processing section selects, for the ROI region and/or tile to be used in image compression, an image region which is preset in accordance with the guide display, and thereafter compresses the image data for recording captured by the image capturing section.

Generally, the user places a main subject on a screen in accordance with the guide display. Therefore, according to the guide display the electronic camera can presume the range in which the main subject is placed within the screen with a high reliability. By selecting the ROI region and/or tile in accordance with the presumed position or range of the main subject as described above, it is possible to surely reduce compression degradation of the main subject.

Moreover, placing a tile boundary so as to avoid the range presumed from the guide display in which the main subject is positioned, for example, makes it possible to properly prevent an adverse effect that a compressive strain of the tile boundary overlaps with the main subject.

Further, using this electronic camera, the user can set the ROI region and/or tile through a successive operation of selecting the guide display depending on a photographic scene. Therefore, the user need not particularly designate the ROI region and/or tile specially, so that he/she can concentrate more on a shooting.

[3] Preferably, the electronic camera further includes a focus controlling section which selects a focus detection area from a photographic screen and focuses a lens on a subject in the selected focus detection area. The display section combines, for display, the image data for monitoring captured by the image capturing section and a selection state of the focus detection area as the auxiliary display. The compression processing section selects, for the ROI region and/or tile to be used in image compression, an image region corresponding to the selected focus detection area, and thereafter compresses the image data for recording captured by the image capturing section.

Generally, it is very probable that the selected focus detection area includes the main subject. Therefore, it is made possible to presume the position of the main subject from the focus detection area and select the ROI region and/or tile in accordance with the position of the main subject. In this case, the compression degradation of the main subject can be reduced more surely.

Moreover, placing the tile boundary so as to avoid the range presumed from the selected area in which the main subject is positioned, for example, makes it possible to properly prevent the adverse effect that the compressive strain of the tile boundary overlaps with the main subject.

In particular, the ROI region and/or tile can be set during the ordinary photographing processing such as in the operation of selecting the focus detection area.

For another example, when the electronic camera automatically selects the focus detection area according to judgment on the situation of a field, it can automatically select the ROI region and/or tile making use of a result of the selection of the focus detection area.

Through such operations, the user need not particularly designate the ROI region and/or tile specially, so that he/she can concentrate more on a shooting.

[4] Preferably, the electronic camera further includes an operation section which selects at least one of a plurality of image regions in accordance with an operational input from a user. The plurality of image regions are segments divided according to a predetermined segmentation. The display section combines, for display, the image data and a selection state of the segment as the auxiliary display. The compression processing section selects, for the ROI region and/or tile to be used in image compression, the image region selected via the operation section, and thereafter compresses the image data for recording captured by the image capturing section.

In this case, the user can intuitively designate the ROI region and/or tile with the operation section, viewing the image data in the segment. Especially in case that plural image regions are selectable, the user can easily and directly designate the ROI region of a complicated shape by combining these image regions.

[5] Preferably, the electronic camera further includes an operation section which accepts a designation of the image region in accordance with an operational input from a user by moving a display position of an index showing a range and/or a position of an image region combined and displayed on the display section. The compression processing section selects the ROI region and/or tile to be used in image compression according to the image region designated via the operation section, and thereafter compresses the image data for recording captured by the image capturing section.

In this case, the user can easily and directly designate the ROI region and/or tile by moving the position of the index on the display with the operation section while viewing a display screen of the electronic camera.

[6] Another electronic camera of the present invention includes an image capturing section, a display section, a tablet section, and a compression processing section. The image capturing section captures a subject and generates image data. The display section displays the image data on a display screen. The tablet section detects a regional input on the display screen. The compression processing section selects, for an ROI region and/or a tile to be used in image compression, an image region inputted via the tablet section, and thereafter compresses image data for recording captured by the image capturing section.

In this case, the user can directly and intuitively designate the ROI region and/or tile on the display screen of the electronic camera. Especially when receiving an input of a region with undeterminable shape from the tablet section, the electronic camera can easily designate the ROI region having a complicated shape.

[7] Preferably, the electronic camera further includes a release section which instructs the image capturing section to start image capturing for recording. The display section combines, for display, image data for monitoring the subject captured by the image capturing section and an auxiliary display for supporting a selection of the ROI region and/or tile to be used in image compression before the instruction by the release section. The compression processing section selects, for the ROI region and/or tile, an image region selected in accordance with the auxiliary display before the instruction by the release section, and thereafter compresses the image data for recording captured by the image capturing section according to the instruction by the release section.

[8] Further, preferably, the compression processing section executes image compression in compliance with JPEG2000.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIGS. 5(A) and (B) show that an ROI region and a tile are selected based on a focus detection area being selected;

DESCRIPTION OF THE PREFERRED EMBODIMENTS

An embodiment according to the present invention will be described below based on the drawings.

[Description of Configuration of Electronic Camera]

Figure 1:
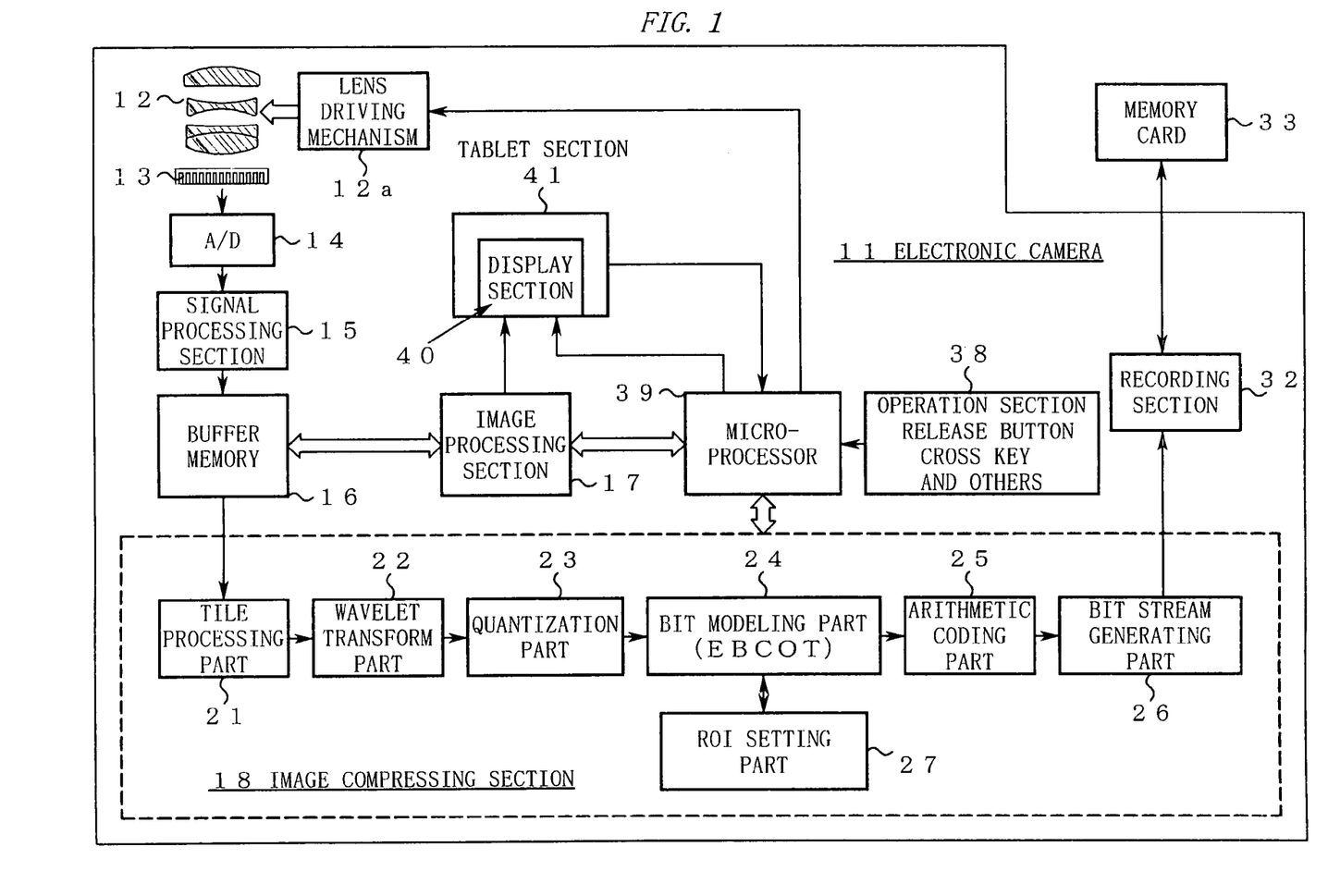
FIG. 1 shows a configuration of an electronic camera 11 in the present embodiment.

FIG. 1 is a diagram showing a configuration of an electronic camera 11 in the present embodiment.

In FIG. 1, a lens 12 is attached to the electronic camera 11. The focus of the lens 12 is adjusted by a lens driving mechanism 12a. A light-receiving surface of an image pickup device 13 is placed in an image space of the lens 12. An output of the image pickup device 13 is processed via an AD conversion section 14 and a signal processing section 15 and thereafter recorded in a buffer memory 16.

An image processing section 17 and an image compressing section 18 are respectively connected to a data bus of the buffer memory 16.

A microprocessor 39 acquires image data of focus detection areas via the image compressing section 18 and detects contrasts of these focus detection areas. The microprocessor 39 controls the focus of the lens 12 by controlling the lens driving mechanism 12a in a direction in which the contrast increases.

Image data for monitoring processed by the image processing section 17 is given to a display section 40. The display section 40 combines and displays on a display screen (not shown) of the electronic camera 11 the image data for monitoring and display data given from the microprocessor 39. A tablet section 41 which reads the position of contact of a finger, a pen, or the like is placed on the display screen. Positional data read by the tablet section 41 is given to the microprocessor 39.

On the other hand, image data for recording processed by the image processing section 17 is given to the image compressing section 18.

This image compressing section 18 includes the following components (1) to (7).
(1) Tile processing part 21
(2) Wavelet transform part 22
(3) Quantization part 23
(4) Bit modeling part 24
(5) Arithmetic coding part 25
(6) Bit stream generating part 26
(7) ROI setting part 27

Specific processing operations of these components (1) to (7) have been already described in the above-described conventional example, and the description thereof is omitted here.

A compressed file generated in the image compressing section 18 is given to a recording section 32. The recording section 32 records this compressed file on a memory card 33.

Further, an operation section 38 composed of a release button, a cross key, a setting button, and so on is provided in a casing of the electronic camera 11. An output signal of the operation section 38 is given to the microprocessor 39. This microprocessor 39 controls a system of the electronic camera 11 and is connected to the image processing section 17, the image compressing section 18, and so on via signal lines.

[Description of Operation of the Present Embodiment]

Figure 2:
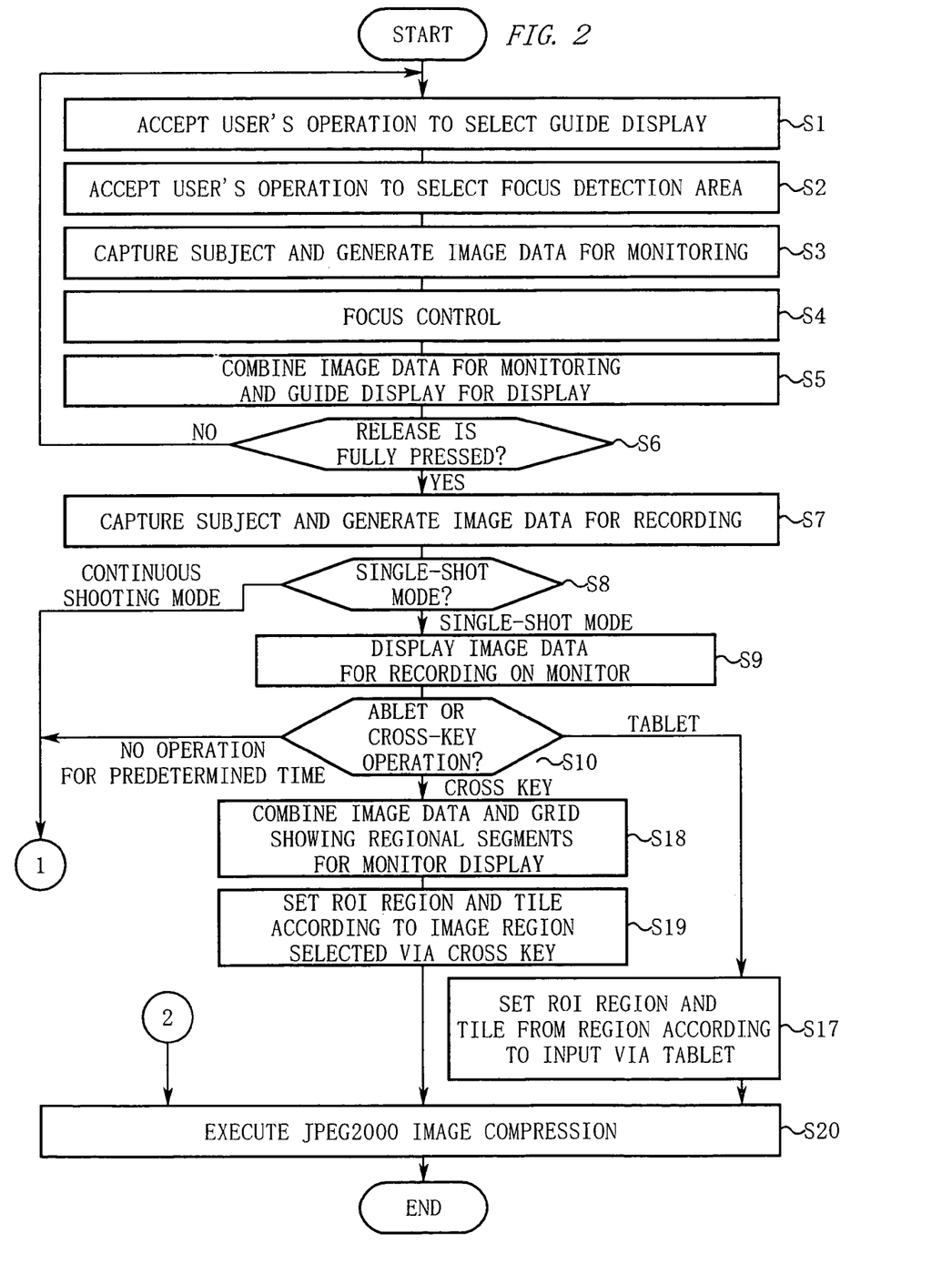
FIG. 2 is a flowchart (1/2) explaining an operation of the present embodiment.
Figure 3:
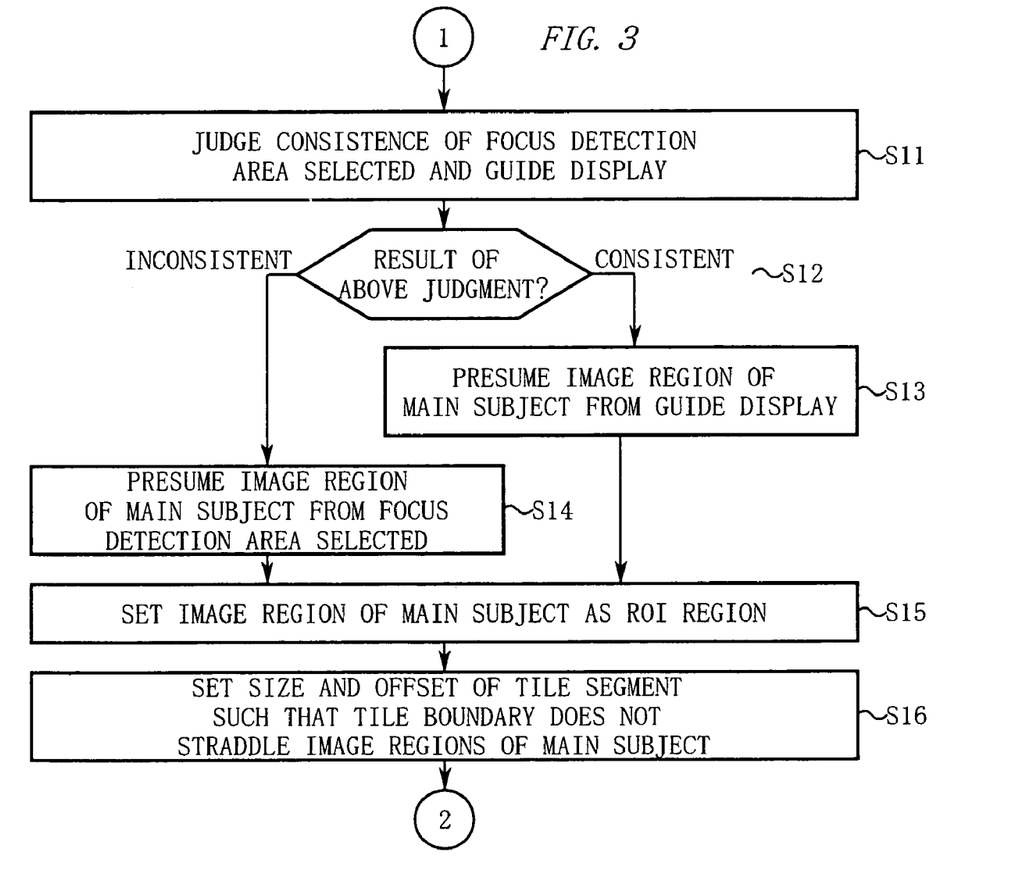
FIG. 3 is a flowchart (2/2) explaining the operation of the present embodiment.

FIG. 2 and FIG. 3 are flowcharts describing an operation of the present embodiment. The operation of the present embodiment will be described below according to step numbers shown in these figures.

Figure 4:
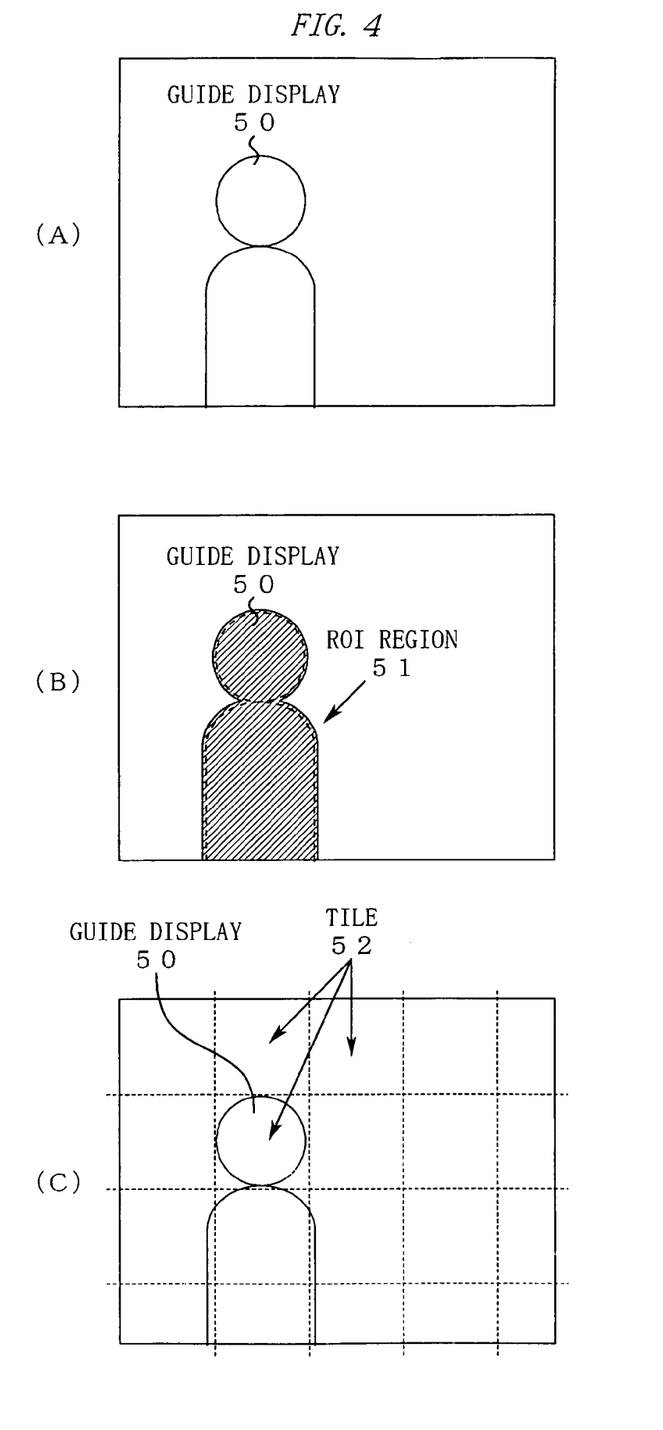
FIGS. 4(A) to (C) show that an ROI region and a tile are selected based on a guide display.

Step S1: Before photographing, a user can input a selection of the kind of a photographic subject by operating the operation section 38. The microprocessor 39 selects a guide display predetermined corresponding to the selected kind of the photographic subject. This guide display is a display pattern to show a recommendable composition such as shown in FIG. 4(A).

Step S2: Further, the user can perform an operation of selecting a focus detection area by operating the operation section 38. The microprocessor 39 stores a result of this selection so that data can be referred to at the time of later-described focus control.

Step S3: The image pickup device 13 captures image data for monitoring, being operated in a draft mode (an image capturing mode in which data is read at a high-speed frame rate while horizontal lines are thinned out).

Step S4: The microprocessor 39 extracts a region corresponding to a focus detection area being currently selected from the image data for monitoring and detects a contrast of the extracted region. The microprocessor 39 controls the focus of the lens 12 in a direction in which the contrast increases via the lens driving mechanism 12a.

It is also possible to keep track of the movement of a main subject in a screen by detecting the movement of the contrast in the screen and move the focus detection area being selected in accordance with the track.

Step S5: The display section 40 displays on a monitor the image data for monitoring processed by the image processing section 17.

When the operation of selecting the guide display is performed in step S1, the display section 40 combines and displays on the monitor the image data for monitoring and the guide display.

Usually, the user adjusts the position of the main subject within the screen in accordance with this guide display and determines a photographic composition.

Step S6: Here, the microprocessor 39 judges whether the release button is fully pressed.

If the release button is not fully pressed, the microprocessor 39 returns the operation to step S1. On the other hand, if the release button is fully pressed, the microprocessor 39 advances the operation to step S7.

Step S7: The image pickup device 13 captures image data for recording, being operated in a high-resolution mode (an image capturing mode in which data is read at high resolution).

Step S8: The microprocessor 39 judges whether the electronic camera 11 is set in a single-shot mode.

Here, in the single-shot mode, the microprocessor 39 moves the operation to step S9. On the other hand, in a continuous shooting mode, the microprocessor 39 moves the operation to later-described step S11.

Step S9: The image processing section 17 generates quick view image data from the image data for recording and outputs it to the display section 40. The display section 40 displays this quick view image (still image) as a photographic result on the monitor.

Step S10: During the display of this quick view image, the microprocessor 39 monitors operational inputs to the tablet section 41 and the cross key.

Here, with no operational input after a predetermined period of time (long enough to judge that the user will not make an operational input) has elapsed, the microprocessor 39 moves the operation to the later-described step S11. On the other hand, with the operational input to the tablet section 41, the microprocessor 39 moves the operation to later-described step S17. With the operational input to the cross key, the microprocessor 39 moves the operation to later-described step S18.

Step S11: The microprocessor 39 judges a consistence between the guide display and the focus detection area being currently selected.

For example, it can be judged that they are consistent, when a placement position of the main subject recommended by the guide display coincide with the focus detection area being currently selected. In this case, the main subject is highly likely to be placed within a range recommended by the guide display.

On the other hand, if the placement position of the main subject recommended by the guide display and the focus detection area being currently selected are displaced from each other, it can be judged that they are not consistent. In this case, the main subject is highly likely to be placed in a position different from the guide display.

Step S12: with the judgment result of "they are consistent", the microprocessor 39 moves the operation to step S13.

On the other hand, with the judgment result of "they are not consistent", the microprocessor 39 moves the operation to step S14.

Step S13: Here, the guide display and the focus detection area are consistent so that the main subject is highly likely to be placed within the range recommended by the guide display. Hence, the placement range recommended by the guide display is presumed to be an image region of the main subject.

For example, in the case of a guide display 50 having a human shape shown in FIG. 4(A), the entire human shape, a face portion of the human shape, a portion around eyes of the human shape, and so on are presumed to be the image region of the main subject.

After such a presumption operation, the microprocessor 39 moves the operation to later-described step S15.

Step S14: Here, the guide display and the focus detection area are not consistent with each other so that the main subject is likely to be placed independently of the guide display.

Hence, the microprocessor 39 sets a predetermined range so as to include the focus detection area being currently selected therein, and presumes the predetermined range to be the image region including the main subject.

For example, the image region of the main subject may be presumed by selecting a focus range judged from contrast judgment and/or a region surrounded by edges (containing a screen frame) from the range containing the currently selected focus detection area.

Step S15: The microprocessor 30 generates a binarized bitmap which masks the presumed image region of the main subject and sets it as the ROI region in the ROI setting part 27.

FIG. 4(B) is a diagram showing an ROI region 51 generated from the guide display 50. In this case, the entire human shape of the guide display 50 is regarded as the ROI region.

Figure 5:
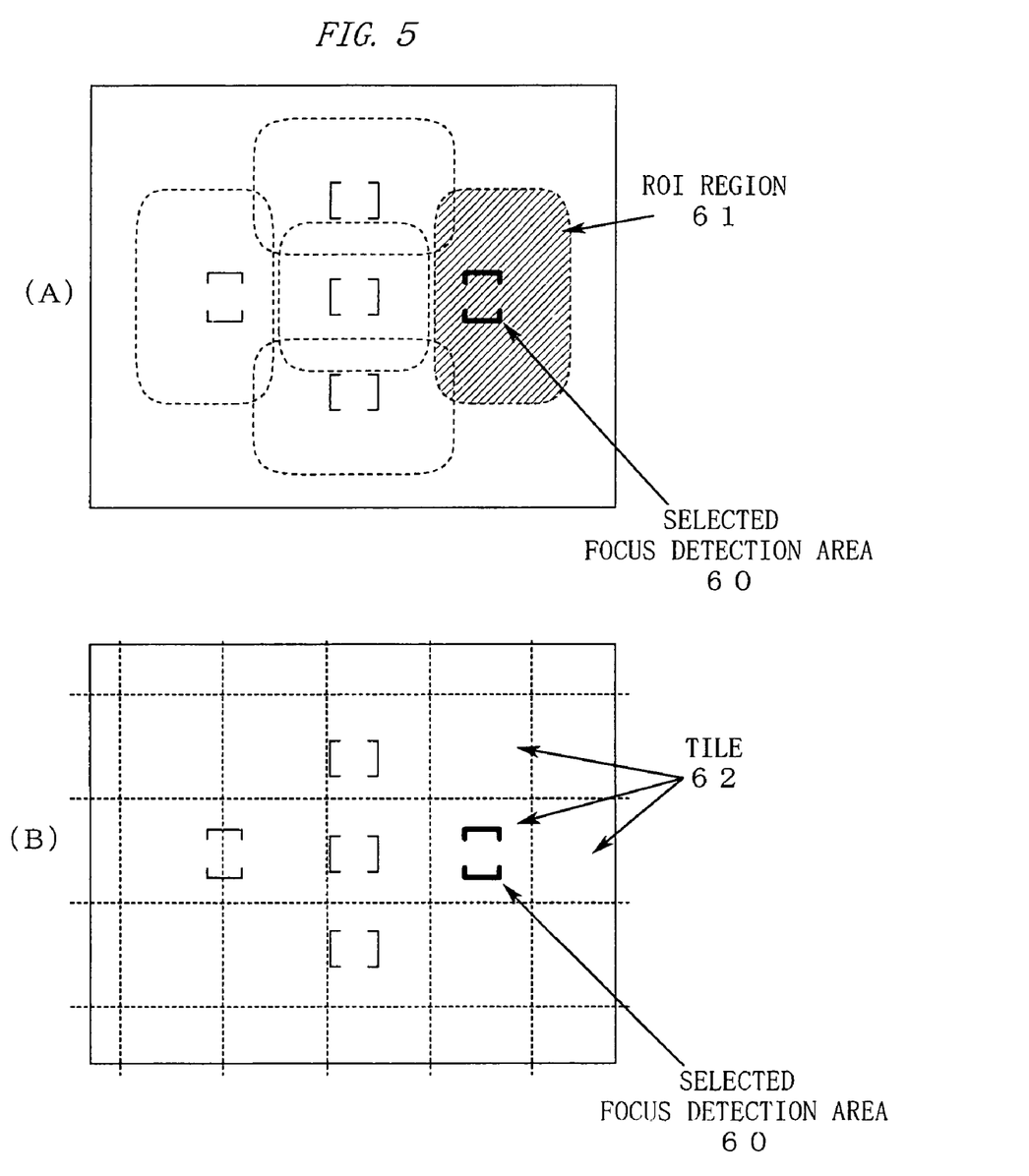

On the other hand, FIG. 5(A) is a diagram showing an ROI region 61 generated from a focus detection area being currently selected 60. In this case, a predetermined region containing the focus detection area being currently selected 60 is regarded as the ROI region 61.

Step S16: Subsequently, the microprocessor 39 determines the size and offset of tile segments in such a manner that a boundary of the tile segments does not cross the presumed image region of the main subject. The microprocessor 39 sets the determined size and offset of the tile segments in the tile processing part 21.

FIG. 4(C) is a diagram showing tiles 52 generated from the guide display 50. In this case, the tile 52 is set in such a manner that a boundary of tile segments does not cross the face portion of the guide display 50.

On the other hand, FIG. 5(B) is a diagram showing tiles 62 generated from the focus detection area being currently selected 60. In this case, the tile 62 is set in such a manner that the focus detection area being currently selected 60 is located in about the center of the tile.

After completion of setting the ROI region and the tile in this manner, the microprocessor 39 moves the operation to step S20.

Step S17: Here, the microprocessor 39 has detected a tablet operation, and therefore judges that the user is touching the display screen with his or her finger to specify the range of the main subject. Hence, the microprocessor 39 reads a trace of the finger movement or the like via the tablet section 41. The microprocessor 39 performs the setting of the ROI region and the tile according to the trace.

Figure 6:
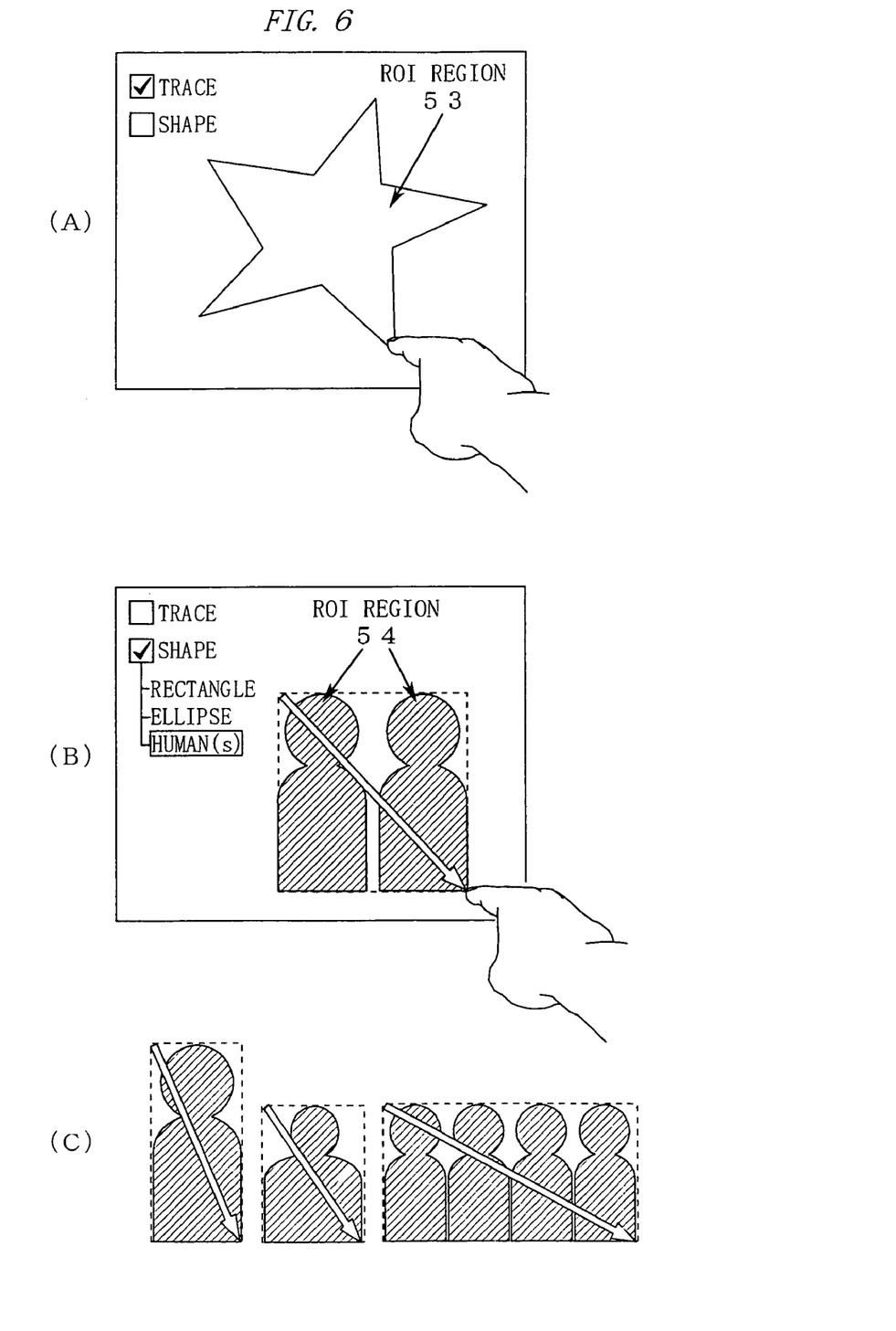
FIGS. 6(A) to (C) show that an ROI region and a tile are selected based on a tablet input.

For example, when the trace can be judged as an almost closed region as shown in FIG. 6(A), the microprocessor 39 sets this closed region as an ROI region 53. Moreover, the microprocessor 39 sets the size and offset of tile segments in such a manner that a boundary of the tile segments does not cross the closed region.

Further, for example, when the trace is almost linear as shown in FIG. 6(B), the microprocessor 39 finds a rectangle with this trace as a diagonal line and sets a closed region (a human shape, an ellipse, a rectangle, or the like) which is inscribed in the rectangle as an ROI region 54. Furthermore, the microprocessor 39 sets the size and offset of tile segments in such a manner that a boundary of the tile segments does not cross the closed region.

Note that as shown in FIG. 6(C), regarding an input of the human shape, the number of human-shaped patterns is adjusted properly according to the horizontal to vertical ratio of the rectangle with the trace as the diagonal line. Consequently, it becomes possible to rapidly and easily input human shapes of plural people.

After completion of setting the ROI region and the tile in this manner, the microprocessor 39 moves the operation to step S20.

Step S18: Here, the microprocessor 39 has detected the operation of the cross key, and therefore judges that the user operates the cross key to specify the range of the main subject. Hence, the microprocessor 39 instructs the display section 40 to display a grid showing regional segments. The display section 40 displays the grid while superimposing it on a quick view display of the display screen as shown in FIG. 7(A) and FIG. 7(B).

Step S19: The user moves a focus (a cursor) along segments of the grid by pressing upper, lower, left, and right sides of a cross key 66. On this occasion, the user selects a region being currently focused by pressing the center of the cross key 66. By accepting this region selection only once, a specific division (a diagonally hatched region) on the screen can be selected rapidly as shown in FIG. 7(A).

Figure 7:
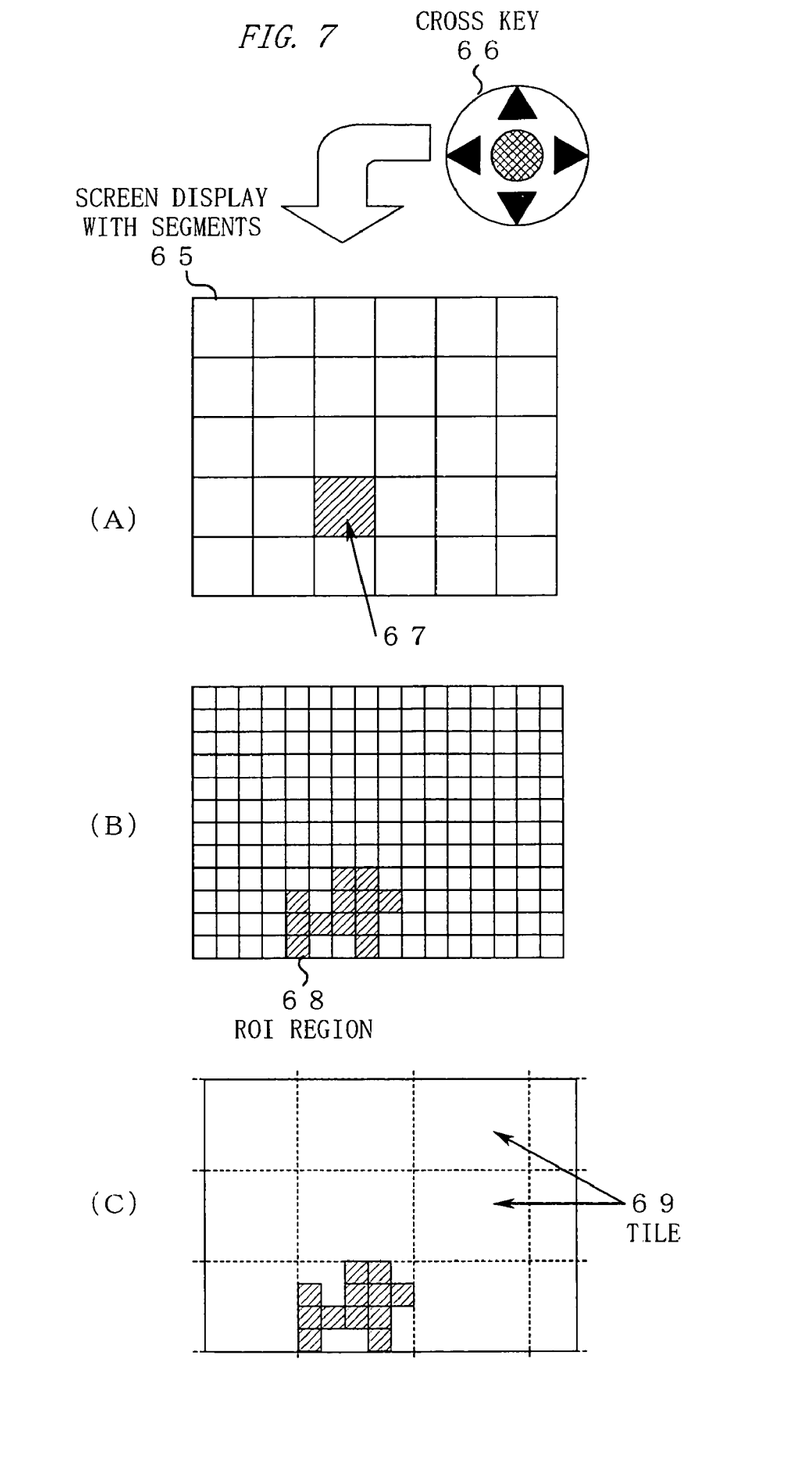
FIGS. 7(A) to (C) show that an ROI region and a tile are selected based on an operational input to a cross key.

Further, by repeating the above-described region selection plural times, a region having a complicated shape such as shown by diagonal hatching in FIG. 7(B) can also be inputted.

The microprocessor 39 sets the regions selected as described above as ROI regions 67 and 68. Further, the microprocessor 39 sets the size and offset of tiles 69 in such a manner that a boundary of tile segments does not cross this region.

Figure 8:
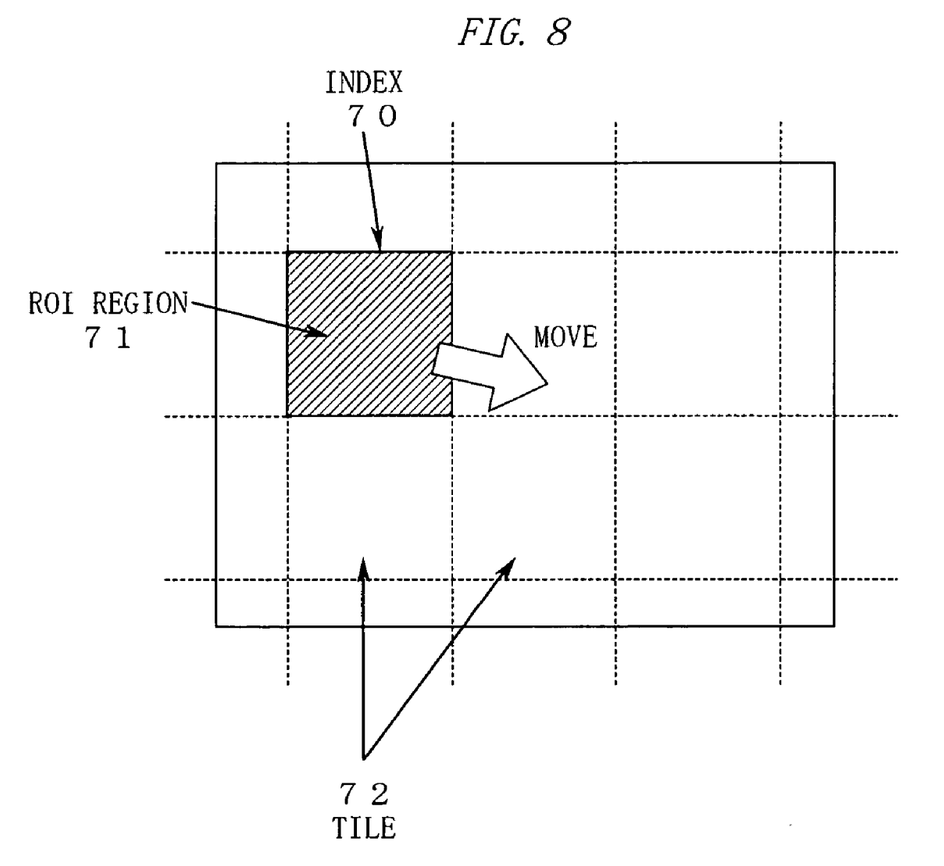
FIG. 8 show that an ROI region and a tile are selected based on an operational input to the cross key.

By moving or scaling up/down an index 70 showing the range and position of an ROI region 71 through the operation to the cross key as shown in FIG. 8, the designation of the ROI region 71 may be performed. In this case, the microprocessor 39 sets the size and offset of tiles 72 in such a manner that a boundary of tile segments does not cross the ROI region 71.

After completion of setting the ROI region and the tile in this manner, the microprocessor 39 moves the operation to step S20.

Step S20: The image compressing section 18 executes image compression in compliance with JPEG2000 according to the set ROI region and tile segment.

Effects, etc. of the Present Embodiment

As described above, according to the present embodiment, the ROI region and the tile segments can be set by making use of the following items for judgment.
(1) Guide display
(2) Focus detection area being currently selected
(3) Regional input to the tablet section 41
(4) Regional designation by the cross key.

In particular, according to the present embodiment, it becomes possible to select the main subject according to the user's intention more reliably than before by using the plural items for judgment (1) to (4) according to the operating conditions.

As a result, it becomes possible to set the ROI region and the tile in accordance with the main subject more appropriately and surely avoid compression degradation of the main subject.

Supplementary Description of the Present Embodiment

Note that the above-described embodiment describes the case where image compression in compliance with JPEG2000. However, the present invention is not limited thereto. Generally, the present invention is applicable to any case where ROI coding or image compression on a tile-by-tile basis is performed.

Further, the above-described embodiment describes the regional designation using the cross key (step S19 in FIG. 2). However, the operation section of the present invention is not limited to the cross key. For example, an operation section such as a zoom button, a release button, or the like of the electronic camera may be used as the operation section for regional designation.

According to the above-described embodiment, the ROI region (here, the image region presumed to be the main subject) may be selectively recorded in the form of RAW data.

Furthermore, according to the above-described embodiment, it is also possible to detect a specific color component (for example, a human flesh-colored component) from image signals obtained by capturing the subject and set the ROI region and/or tile so as to include the region of the detected specific color component therein. This operation makes it possible to detect the position of the main subject in the screen from the specific color component and set the ROI region and/or tile properly. Moreover, the electronic camera may automatically set the ROI region and/or tile by detecting the specific color component. In this case, the user need not input the ROI region and/or tile specially, and therefore can concentrate on a shooting.

The invention is not limited to the above embodiments and various modifications may be made without departing from the spirit and scope of the invention. Any improvement may be made in part or all of the components.

What is claimed is:

1. An electronic camera comprising:
    an image capturing section which captures a subject and generates image data;
        a display section which combines, for display, image data for monitoring and an auxiliary display, the image data for monitoring being captured by said image capturing section, the auxiliary display being for supporting a selection of at least one of an ROI region and a tile to be used in image compression;
        a compression processing section which selects, for at least one of the ROI region and tile, an image region which is preset in accordance with the auxiliary display, and thereafter compresses image data for recording captured by said image capturing section; and
    a guide section which determines a guide display to show a recommended composition, according to a kind of a photographic subject a user selects, wherein:
        said display section combines, for display, the image data for monitoring captured by said image capturing section and the guide display; and
        said compression processing section selects, for at least one of the ROI region and tile to be used in image compression, an image region which is preset in accordance with the guide display, and thereafter compresses the image data for recording captured by said image capturing section.

2. The electronic camera according to claim 1, further comprising:
    an operation section which selects at least one of a plurality of image regions in accordance with an operational input from a user, the plurality of image regions being segments divided according to a predetermined segmentation, wherein
said display section combines the image data and a selection state of a segment for display, and
said compression processing section selects, for at least one of the ROI region and tile to be used in image compression, the image region selected via said operation section, and thereafter compresses the image data for recording captured by said image capturing section.

3. The electronic camera according to claim 1, wherein said compression processing section executes image compression in compliance with JPEG2000.

4. An electronic camera comprising:
    an image capturing section which captures a subject and generates image data;
        a display section which combines, for display, image data for monitoring and an auxiliary display, the image data for monitoring being captured by said image capturing section, the auxiliary display being for supporting a selection of at least one of an ROI region and a tile to be used in image compression;
        a compression processing section which selects, for at least one of the ROI region and tile, an image region which is preset in accordance with the auxiliary display, and thereafter compresses image data for recording captured by said image capturing section; and
        a focus controlling section which selects a focus detection area from a photographic screen and focuses a lens on a subject in the selected focus detection area, wherein:

said display section combines, for display, the image data for monitoring captured by said image capturing section and a selection state of the focus detection area; and said compression processing section selects, for at least one of the ROI region and tile to be used in image compression, an image region corresponding to the selected focus detection area, and thereafter compresses the image data for recording captured by said image capturing section.

5. The electronic camera according to claim 4, further comprising:

an operation section which selects at least one of a plurality of image regions in accordance with an operational input from a user, the plurality of image regions being segments divided according to a predetermined segmentation, wherein said display section combines the image data and a selection state of a segment for display, and said compression processing section selects, for at least one of the ROI region and tile to be used in image compression, the image region selected via said operation section, and thereafter compresses the image data for recording captured by said image capturing section.

6. The electronic camera according to claim 4, wherein said compression processing section executes image compression in compliance with JPEG2000.

7. An electronic camera comprising:

an image capturing section which captures a subject and generates image data;

a display section which combines, for display, image data for monitoring and an auxiliary display, the image data for monitoring being captured by said image capturing section, the auxiliary display being for supporting a selection of at least one of an ROI region and a tile to be used in image compression;

a compression processing section which selects, for at least one of the ROI region and tile, an image region which is preset in accordance with the auxiliary display, and thereafter compresses image data for recording captured by said image capturing section; and an operation section which accepts a designation of the image region in accordance with an operational input from a user by moving a display position of an index which shows at least one of a range and position of an image region combined and displayed on said display section, wherein said compression processing section selects at least one of the ROI region and tile to be used in image compression according to the image region designated via said operation section, and thereafter compresses the image data for recording captured by said image capturing section.

8. The electronic camera according to claim 7, further comprising:

an operation section which selects at least one of a plurality of image regions in accordance with an operational input from a user, the plurality of image regions being segments divided according to a predetermined segmentation, wherein said display section combines the image data and a selection state of a segment for display, and said compression processing section selects, for at least one of the ROI region and tile to be used in image compression, the image region selected via said operation section, and thereafter compresses the image data for recording captured by said image capturing section.

9. The electronic camera according to claim 7, wherein said compression processing section executes image compression in compliance with JPEG2000.

10. An electronic camera comprising:

an image capturing section which captures a subject and generates image data;

a display section which combines, for display, image data for monitoring and an auxiliary display, the image data for monitoring being captured by said image capturing section, the auxiliary display being for supporting a selection of at least one of an ROI region and a tile to be used in image compression;

a compression processing section which selects, for at least one of the ROI region and tile, an image region which is preset in accordance with the auxiliary display, and thereafter compresses image data for recording captured by said image capturing section; and a release section which instructs said image capturing section to start image capturing for recording, wherein:

said display section combines, for display, image data for monitoring a subject and an auxiliary display before the instruction by said release section, the image data for monitoring a subject being captured by said image capturing section, the auxiliary display being for supporting a selection of at least one of the ROI region and a tile to be used in image compression; and said compression processing section selects, for at least one of the ROI region and tile, an image region selected in accordance with the auxiliary display before the instruction by said release section, and thereafter compresses the image data for recording captured by said image capturing section according to the instruction by said release section.

11. The electronic camera according to claim 10, further comprising:

an operation section which selects at least one of a plurality of image regions in accordance with an operational input from a user, the plurality of image regions being segments divided according to a predetermined segmentation, wherein said display section combines the image data and a selection state of a segment for display, and said compression processing section selects, for at least one of the ROI region and tile to be used in image compression, the image region selected via said operation section, and thereafter compresses the image data for recording captured by said image capturing section.

12. The electronic camera according to claim 10, wherein said compression processing section executes image compression in compliance with JPEG2000.

* * * * *